April 27, 1948.　　　D. S. PENSYL　　　2,440,289
AUTOMATIC VOLUME CONTROL FOR PULSE SYSTEMS
Filed Feb. 18, 1943　　　2 Sheets-Sheet 1

INVENTOR
DANIEL S. PENSYL
BY
ATTORNEY

April 27, 1948.    D. S. PENSYL    2,440,289
AUTOMATIC VOLUME CONTROL FOR PULSE SYSTEMS
Filed Feb. 18, 1943    2 Sheets-Sheet 2
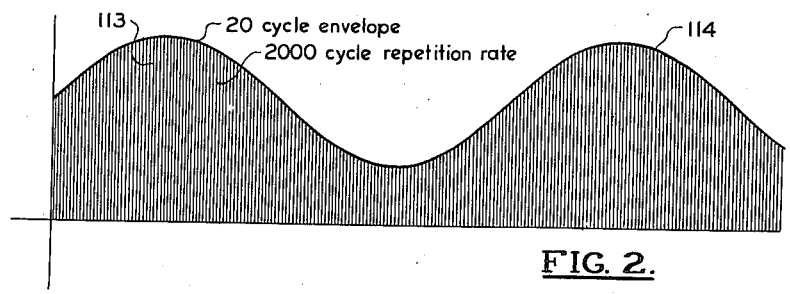
FIG. 2.
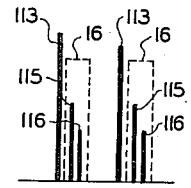
FIG. 3.
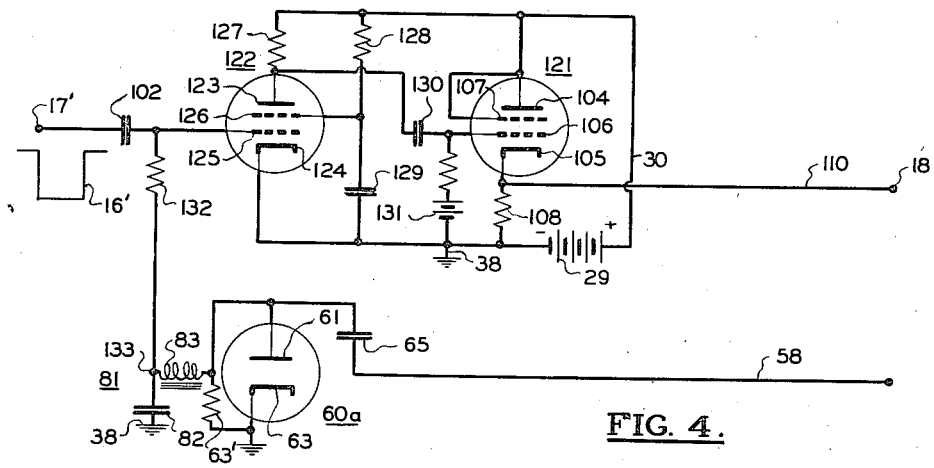
INVENTOR
DANIEL S. PENSYL
BY
ATTORNEY Patented Apr. 27, 1948

2,440,289

UNITED STATES PATENT OFFICE 2,440,289

AUTOMATIC VOLUME CONTROL FOR PULSE SYSTEMS

Daniel S. Pensyl, Garden City, N. Y., assignor to The Sperry Corporation, a corporation of Delaware Application February 18, 1943, Serial No. 476,357

11 Claims. (Cl. 250—1.72)

My invention relates to circuits for electric discharge devices and concerns, particularly, automatic volume control systems.

It is an object of my invention to provide an improved automatic volume control or an automatic gain control for radio circuits.

A further object of my invention is to provide such control systems which are particularly adapted for micro-wave pulse receivers and for receivers in which very wide swings of input power are encountered.

A further object of my invention is to provide an automatic volume control system which works rapidly to erase low frequency modulations without interfering with the relatively higher frequency which carries the intelligence on the signal.

Still another object of my invention is to provide an automatic volume control system which maintains the receiver output sufficiently uniform for operation of servo control apparatus.

Scanning and target-following systems have been devised in which micro-wave radio frequency energy is projected in pulses at a suitable repetition rate, such as 2000 cycles per second, for example. The micro-wave energy may have a frequency as high as 9000 megacycles or more, for example, with a pulse duration of the order of a microsecond. If the projected beam of radiant energy is intercepted by a target, pulses are reflected. A receiver is provided which is responsive to the reflected pulses and thus indicates the presence of a target. Means operated by the receiver may be provided for causing the micro-wave projector to track or follow the target. In one system for tracking the target, the projector is caused to spin about an axis making a very small angle with the direction in which the beam of radiant energy is projected. Accordingly, when the spin axis of the projector points toward the target, the strength of the reflected wave will be uniform, whereas when the spin axis is deflected slightly away from the target, the strength of the reflected signals will be modulated at the frequency of the rotation of the projector around the spin axis. This frequency may be of the order of 20 cycles per second in some systems.

In order to cause the spinning projector and associated indicating and control devices to track the target, servo mechanism is employed which must be operated by the micro-wave pulse receiver. Satisfactory operation of such servo mechanism depends upon maintenance of the receiver output at a substantially uniform level.

However, the strength of the received signal necessarily varies within exceedingly wide limits, owing to the fact that the apparatus must be responsive to targets at both close and distant ranges. Furthermore, variations in received signal strength occur, owing to variations in propagation effects, changing attitude of the target, and changing transmitter output. These changes take place in such unpredictable manners and so rapidly that they cannot be readily compensated by manual control, nor by customary forms of automatic volume control without interfering with the desired modulation of signal.

It is, accordingly, an object of my invention to provide an automatic gain control system for the receiver of an automatic target following system which maintains the output level at a sufficiently uniform value for satisfactory operation of servo mechanism.

Other and further objects and advantages will become apparent as the description proceeds.

In carrying out my invention in its preferred form, I provide an automatic volume control detector which is responsive to the output of a pulse receiver. For retaining the modulation resulting from the frequency of rotation of the spinning axis, I provide a low-pass filter for the detector output which has a sharp cut-off at a frequency below the frequency of the modulation corresponding to the spinning of the projector. A direct current and low-frequency amplifier is provided for producing a voltage varying between suitable limits above and below ground potential. The automatic volume control detector is connected to the input of the direct current amplifier through the filter for adjusting the output voltage of the direct current amplifier in accordance with variations in the receiver output.

The direct current amplifier output is applied to a level-setter diode, which is, in turn, connected to the input or control electrode of an amplifier arranged as an impedance transformer such as a cathode follower. The output of the cathode follower is utilized as the screen, plate or screen and plate potential source of one or more stages of the receiver amplifier for varying the gain of the amplifier inversely in accordance with the strength of the receiver output.

A better understanding of the invention will be afforded by the following detailed description when considered in connection with the accompanying drawing, and those features of the invention which are believed to be novel and patentable will be pointed out in the claims appended hereto.

In the drawings,

Fig. 2 is a graph illustrating the character of the signals which are received by pulse receivers, in connection with which my invention may be employed.

Fig. 3 is a graph showing in more detail a portion of Fig. 2.

Fig. 4 is a circuit diagram of another embodiment of my invention forming an automatic volume control.

Fig. 5 is a schematic or block diagram of a modification in the embodiment of Fig. 1 for use when exceptionally great variation in strength of signals is to be expected, and Fig. 6 is a fragmentary circuit diagram of the modified portion of the apparatus of Fig. 5.

Like reference numerals are utilized throughout the drawing to designate like parts.

Figure 1:
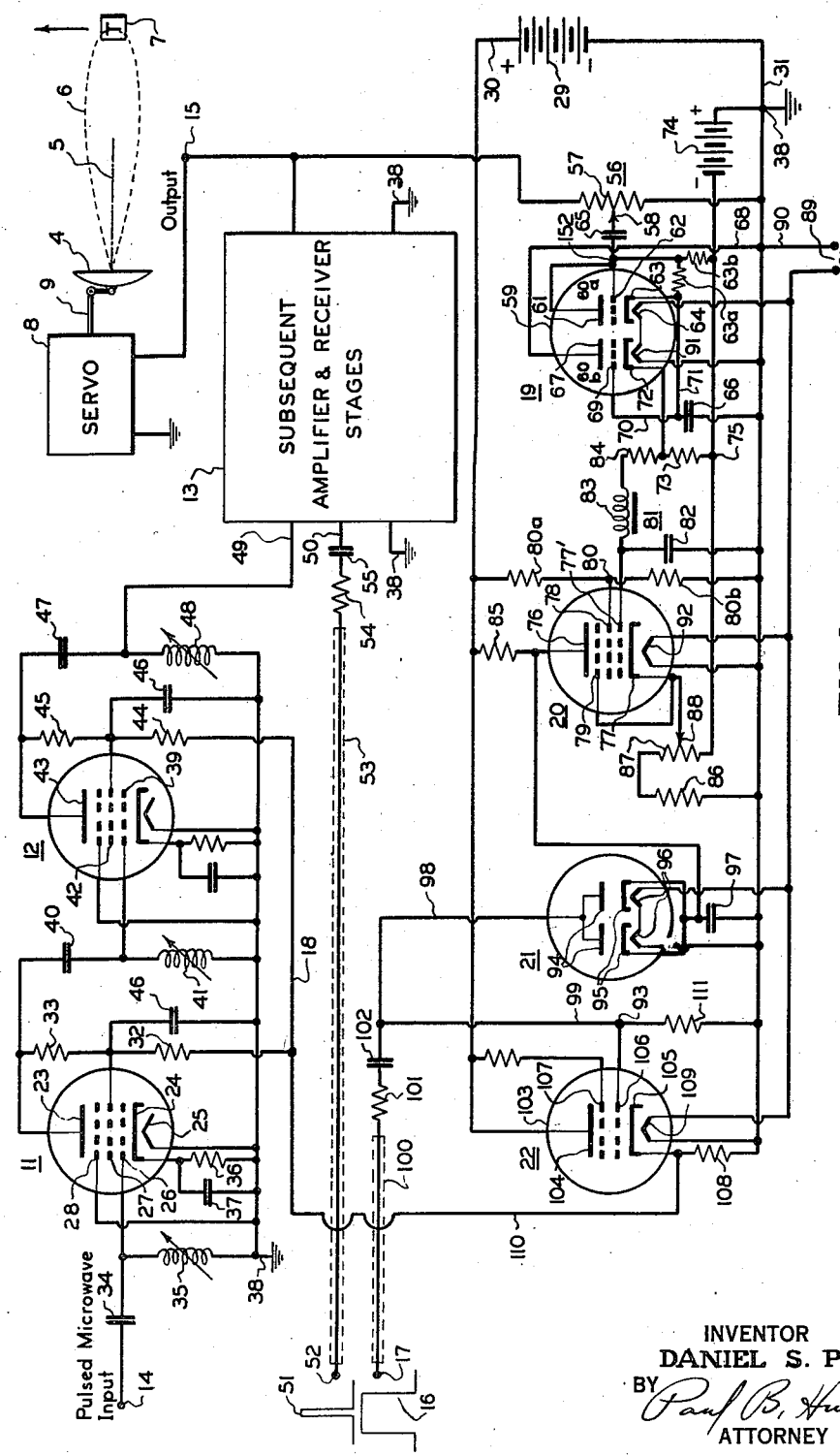
Fig. 1 is a circuit diagram of one embodiment of my invention.

The apparatus shown for the sake of illustration in Fig. 1 comprises a part of a receiver for use in a pulsed micro-wave system. It may be a system of the type in which pulses are transmitted, and reflected pulses are received which occur at a suitable repetition rate, such as 2000 cycles per second, for example, and which are modulated at a relatively low frequency corresponding to the spin frequency of a radiator, which spins about an axis 5 and which projects the transmitted waves 6 and receives any waves which may be reflected from an intercepting target 7. This slow speed modulation which would be at a frequency of 20 cycles per second in a case where the radiator rotates at 20 revolutions per second results from the variation in strength of the transmitted pulses intercepted and variation in strength of reflected pulses as rotation of the radiator brings the axis of maximum radiation and reception closer or farther from the actual position of the target from which pulses are reflected. For following or tracking such a target 7, a servo mechanism 8 is provided which is controlled by the receiver output. The servo mechanism includes a schematically indicated linkage 9 for shifting the spin axis 5 of the radiator 4 as the target 7 moves. A receiver for such a system includes an intermediate frequency amplifier which may consist of a plurality of stages of electric discharge devices having control electrodes, such as vacuum tubes, for example. In the system illustrated, control of amplitude of receiver output is accomplished by control of voltage applied to the first two stages of the intermediate frequency amplifier. In the drawing, the first two stages of the intermediate frequency amplifier are shown separately as represented by vacuum tubes 11 and 12. The remaining amplifier stages, the requisite detector stage and any other desired receiver stages are represented collectively in the drawing by a rectangle 13. For convenience, such a receiver may utilize a common ground connection for one of the connections of each stage.

For application of a pulsed microwave or an intermediate frequency wave from a converter (not shown) to the first intermediate-frequency amplifier stage 11, a connection represented by an input terminal 14 is provided. The final output of the receiver is assumed to appear at an ungrounded output terminal 15. It will be understood that suitable devices such as indicating mechanism (not shown), servo mechanism, or the like which are to be operated by the receiver may be connected to the output terminal 15.

Since the receiver is intended to be responsive only to reflected impulses and not to be responsive directly to transmitted impulses, means are provided for making the receiver responsive only for a time interval between transmitted impulses, which interval begins after the termination of each transmitted pulse. Conventional means for this purpose may be employed, such as a wide time gate consisting of means (not shown) for producing a square wave voltage, the wide time gate being represented by the wave form 16. A wide gate input terminal 17 is provided for application of the wide gate voltage to the receiver for making it receptive during the time interval of the wide gate 16.

A terminal or connection 18 within the receiver is provided for controlling the gain or receptiveness of the receiver, and means are provided for varying the effective strength of the wide gate 16 applied through the terminal 17 and the connection 18 in order to vary the gain of the receiver inversely in accordance with the output level from the terminal 15 in order to maintain the final output substantially uniform. Such gain control means in the apparatus illustrated comprises an automatic volume control detector unit 19 with an input connected to the receiver output terminal 15, a direct-current amplifier 20 for producing a voltage fluctuating in accordance with the output of the automatic volume control detector 19, a device 21 for setting a voltage level controlled by the direct-current amplifier 20, and an impedance transformer or amplifier, shown as a cathode follower 22, for producing voltage fluctuations in response to the wide gate voltage applied at the terminal 17. The output side of cathode follower 22 is connected to the gain control connection 18. The arrangement is such that the cathode follower produces an alternating voltage, representing the wide gate, and which oscillates above and below an average value fixed by the setting maintained by the level setter 21.

The tube 11 constituting the first stage of the intermediate frequency amplifier may be a pentode tube comprising an anode 23, a cathode 24 with an independent heater 25 if desired, a first control electrode or grid 26, a second control electrode or screen grid 27, and a third control electrode or suppressor grid 28.

For energizing this as well as other stages of the receiver, a suitable source of unidirectional voltage such as a B battery 29 is provided having a positive connection 30 and a negative connection 31 shown as a grounded connection. In place of directly connecting the stages 11 and 12 to the positive connection 30 of the anode voltage source 29, however, intermediate control apparatus including the cathode follower 22 is interposed in the form of the apparatus illustrated, and the anode 23 is connected to the gain control connection 18, which in the arrangement illustrated provides the operating voltage for the tubes 11 and 12. In the arrangement illustrated, the screen grid 27 is also connected to the gain control connection 18. For isolating the intermediate-frequency radio energy from the remainder of the circuit, a decoupling resistor 32 is connected between the conductor or connection 18 and the screen grid 27. A load resistor 33 is connected between the screen grid 27 and the anode 23. Although I have found this arrangement for controlling the gain to be satisfactory, it will be understood that my invention is not limited to this precise arrangement and does not exclude the use of a separate gain control electrode such as the screen grid 27 connected to the gain control connection 18 with the anode 23 energized independently of the connection 18.

The signal input or control grid 26 is coupled to the input terminal 14 in a suitable manner, as by means of the coupling condenser 34 and an adjustable grid choke 35. For biasing the control grid 26, a suitable source of bias voltage or a bias connection may be interposed in the circuit between the cathode 24 and the control grid 26. For example, as shown, a bias resistor 36 shunted by a by-pass condenser 37 may be connected between the cathode 24 and a ground connection 38, which may be a common ground connection in the actual apparatus, although shown separately at various points in the drawing for convenience.

The second stage 12 of the intermediate frequency amplifier may be connected in a manner similar to that of the first stage having corresponding elements. Thus, there is a control electrode 39 which is coupled through a coupling condenser 40 and a coupling choke 41 to the anode 23 of the first tube 11. There are also a screen grid 42 and an anode 43 which are connected through resistors 44 and 45 to the gain control connection 18. Screen grid by-pass condensers 46 may be provided in a conventional manner. The output terminal or anode 43 of the second stage tube 12 may be coupled through a coupling condenser 47 and a coupling choke 48 to an input connection 49 of the subsequent receiver stages 13.

Where the receiver is to be made responsive only to pulses reflected from a single target within the range of the pulse projector, means may be provided for making the subsequent receiver stages 13 responsive only for the time duration corresponding to such a selected reflected pulse. For example, a connection 50 to a suitable point (not shown) within the receiver stages 13 may be provided for energizing the receiver only for the time duration of a narrow gate represented by a wave form 51 generated and synchronized by suitable means (not shown) and connected to a narrow gate terminal 52 coupled through a suitable shielded line 53, a resistor 54, and condenser 55 to the control connection 50.

For adjusting the output level to be maintained at the output terminal 15, a potentiometer 56 may be provided, comprising a resistor 57 connected between the receiver output terminal 15 and the ground connection 38, and an adjustable tap 58 slidable along the resistor 57.

The automatic volume control detector unit 19 in the arrangement illustrated comprises a single envelope 59 containing a pair of electric discharge device units 60a and 60b, which may be considered as separate units. The unit 60a is in effect a diode detector, although shown as a triode, with an anode 61 and a control grid 62 connected together to serve in effect as an anode, and a cathode 63. A load resistor 63a is connected between the anode and the cathode of the detector 60a. A separate heater 64 is preferably provided in order to permit the cathode 63 to float at a potential other than ground potential to enable correct biasing relations to be realized. However, my invention is not limited to the specific arrangement shown for isolating the cathode from ground, and it is therefore not limited to the use of a separately heated cathode. Furthermore, it will be understood that my invention is not limited to the use of a diode type of automatic volume control detector. The effective anode of the detector unit 60a, namely, the electrodes 61 and 62, are coupled to the output tap 58 of the potentiometer 56 through a suitable element such as a coupling condenser 65. A second condenser 66 is connected between the cathode 63 and the ground connection 38. Preferably, however, the capacity of the condenser 66 is small in relation to that of the coupling of by-pass condenser 65, so that the diode potential is determined substantially by the potential of the tap 58.

The second unit 60b within the envelope 59 is shown as a triode connected as a cathode follower with an anode 67 connected to the ground connection 38 through a conductor 68, a control electrode 69 connected to the detector cathode 63 through conductors 70 and 71, and a cathode 72 connected through a resistor 73 to a point below ground potential. For providing a source of negative voltage and establishing a point below ground potential, a second voltage source 74 may be provided having a positive terminal connected to the ground connection 38 and having a negative terminal 75 to which the cathode resistor 73 is connected. A bias resistor 63b may be connected between the negative terminal 75 and the diode anode 61.

The direct current amplifier 20 comprises an electric discharge device such as a pentode vacuum tube including an anode 76, a cathode 77, and conventional control electrodes such as a first or control grid 77', a second or screen grid 78, and a third or suppressor grid 79. As shown, the suppressor grid 79 is conventionally connected to the cathode 77, and the screen grid 78 is connected to a junction terminal 80 of a pair of resistors 80a and 80b connected in series across the voltage source 29 to form a voltage divider. The control grid 77' is coupled to the output terminal or cathode 72 of the cathode follower 60b through a low-pass filter 81.

The low-pass filter 81 includes a condenser 82 connected between the control grid 77' and ground, and an impedance unit 83 connected between the detector output terminal 72 and the direct current amplifier input terminal or control grid 77'. For obtaining sharp cut-off, the impedance 83 is preferably in the form of an inductance. Moreover, a damping resistor 84 may also be included in series with the inductance 83. The filter 81 is designed with a time constant for cutting off signal variations fluctuating at frequencies greater than a selected frequency which is less than the frequency of the desired modulations which are to be recovered by the receiver. For example, in the case of a microwave pulse receiver used in a system having a spinning radiator rotating at a speed of 20 revolutions per second, thus producing 20 cycle-per-second modulations, the filter 81 may have a cut-off frequency of approximately 10 cycles per second.

The anode or output terminal 76 of the direct current amplifier 20 is connected to the positive connection 30 of the B battery 29 through a load resistor 85. However, in order to permit the potential of the anode 76 to follow below ground potential, the cathode 77 of the unit 20 is connected to a point below ground potential. For example, a pair of resistors 86, 87 may be connected in series between the negative terminal 75 of the negative voltage source 74 and the ground connection 38. For adjustment of the potential of the cathode 77, a tap 88 slidable along the resistor 87 may be connected to the cathode 77.

For energizing the detector heater 64, a suitable source of filament current, such as an alternating or direct current source 89, may be provided having one terminal 90 grounded. The heater 64 of the unit 60a as well as heaters 91 and 92 of the units 60b and 20, respectively, may be conventionally connected to the heater source 89, thus permitting independent adjustment and variation of the potentials of the cathodes 63, 72 and 77.

The cathode follower 22 is provided with an input terminal 93 which may be brought to a datum or average potential determined by the condition of the direct current amplifier 20. For facilitating the maintenance of such an average or datum potential, the lever setter 21 may be provided. The level setter 21 is in effect a rectifier which may take the form of a diode vacuum tube shown as a double diode, although a unit with a double pair of electrodes is not essential to my invention. As shown, the diode lever setter 21 comprises connected anodes 94 and connected cathodes 95 with independent heaters 96, the latter being connected in series across the filament voltage source 89. The cathodes 95 are connected to the output terminal or anode terminal 76 of the direct current amplifier 20, and a potential storing condenser 97 is connected between the cathodes 95 and the ground connection 38.

The lever setter anodes 94 are connected to the average-potential terminal 93 through conductors 98 and 99. The wide gate terminal 17 is coupled to the average-potential terminal 93 through a shielded line 100, a resistor 101, a coupling condenser 102, and the conductor 99 for the purpose of causing the potential of the cathode follower input to fluctuate about the average level in accordance with the wave form 16.

Although the terminal 93 may be connected directly to suitable points in the amplifiers 11 and 12, I prefer to interpose the cathode follower stage 22. This stage comprises an electric discharge device such as a tetrode vacuum tube 103 having an anode 104, a cathode 105 and control electrode or first grid 106, connected to the average-potential terminal 93, and a screen grid 107. If desired, the tube 103 may be of the beam power amplifier type. A cathode resistor 108 is connected between the cathode 105 and the ground connection 38, and a separate heater 109 may be provided which is connected across the filament source 89.

The cathode 105 serving as the output terminal of the cathode stage follower 22 is connected through a conductor 110 to the gain control connection 18 of the intermediate frequency amplifier stages 11 and 12. For zero-biasing the grid 106, a grid leak resistor 111 may be connected between the grid 106 and the ground connection 38. The time constant of the coupling elements 102 and 111 is made large relative to the repetition rate of the wide gate 16.

The voltage of the source 74 may be approximately half that of the source 29. For example, in the case of vacuum tubes designed for operation with anode voltages in the approximate range from 200 to 250 volts, the voltage supply source 29 may have a rated voltage of 210 volts, and the source 74 may have a rated voltage of 105 volts.

When the receiver is used for operating a tracker in connection with a pulsed microwave system having a spinning radiator, the microwave pulses projected by the radiator may be represented as shown in Fig. 2 by a series of vertical lines 113 each representing a pulse, successive pulses varying in amplitude in accordance with a modulation curve 114 as a result of the spinning of the radiator eccentrically with respect to a line from the radiator to a target. In the case of transmitted pulses having a repetition rate of 2,000 cycles per second and a spinner rotating at 20 cycles per second, the pulses 113 will be ½₀₀₀ second apart, and the modulation envelope 114 will have a frequency of 20 cycles per second. Each of the transmitted pulses 113 may be followed by a plurality of reflected pulses 115, 116, and so forth (Fig. 3), depending upon the number of targets at different ranges intercepting the transmitted pulses 113. The transmitted pulses 113 are eliminated from the input to the receiver by the wide gate 16 represented by dashed lines in Fig. 3. For selecting only one of the targets intercepting transmitted pulses, the narrow gate 51 of Fig. 1 may be employed to make the receiver responsive to only one of the reflected pulses, for example, the reflected pulses 115. The reflected pulses 115 will, like the transmitted pulses 113, fluctuate in magnitude in accordance with the spinner modulations and may therefore be represented by the same graph shown in Fig. 2, having a modulation envelope corresponding to the curve 114.

The curve 114 of Fig. 2, of course, represents ideal conditions with no extraneous modulation such as caused by interference, noise, changes in transmission characteristics, changing attitude of the target, and so forth. To eliminate such undesired modulations is the object of the automatic gain control.

The pulses, which may have been converted to an intermediate frequency, are applied to the intermediate frequency amplifier input terminal 14, and a pulse carrier appears at the output terminal 15. A portion of the output signal is fed back through the potentiometer 56 to the automatic volume control detector unit 19 which recovers the modulation envelope 114. The output appearing at the cathode 72 controls the potential of the control electrode 77' of the direct current amplifier 20 and thereby controls the potential of the anode 76 of the direct current amplifier 20. The amplifier 20 serves both for inverting the phase of the output for degeneration in accordance with the output magnitude, and for introducing gain in the automatic volume control loop. Since the cathode 77 of the direct current amplifier 20 is at negative potential, the output potential taken from the anode 76 may be above or below ground potential according to the magnitude of the receiver output at the terminal 15.

The level-setter diode 21 having its cathode 95 at the potential of the direct current amplifier anode 76 establishes an average level for the diode anodes 94. This establishes an average level about which the input terminal 93 of the impedance transformer or cathode follower 22 may fluctuate when the wide gate 16 is applied thereto. In case the receiver output tends to be relatively great, lowering the potential of the anode 76 below ground, the level-setter diode 21 draws current through the cathode follower grid resistor 111 and establishes a negative average level.

For adjusting the gain of the intermediate frequency amplifier stages 11 and 12 sufficiently to maintain constant output with very large variations of input signal strength, it may be necessary to vary the screen potentials from zero to a large value, such as 150 volts in the case of a 210-volt supply source. A lower limit of zero volts is desirable since the greatest variation in trans-conductance and therefore in amplifier gain takes place in the range between zero and approximately 30 volts, screen potential. The cathode follower stage 22 permits reducing the screen potential of the amplifiers 11 and 12 to zero when the cathode follower 22 is cut off. By providing means for lowering the level set by the diode 21 from a level more negative than the cut-off potential of the cathode follower 22 up to the value to provide a maximum value output, my apparatus permits an automatic control of the gain of the receiver in spite of large variations in input signal strength.

When the level-setter diode 21 is set for relatively low potential, as a result of a relatively strong output at the receiver terminal 15, the magnitude of the wide gate 16 at the wide gate input terminal 17 must rise to a relatively high value before it is sufficient to overcome the negative level and produce an output voltage across the cathode resistor 108. Thus, in effect, the lower portion of the wide gate 16 is cut off, and the level-setter diode serves to cause only so much of the wide gate voltage 16 to be applied to the screen grids 27 and 42 of the intermediate amplifier tubes 11 and 12 as may be necessary to maintain the desired level of output at the output terminal 15 of the receiver.

The narrow gate 51 further serves to prevent the receiver from being responsive except during the time interval represented by the narrow gate. However, my invention, when applied to pulse receivers, is not limited to utilizing only the receiver output taken through the stages 13 controlled by the narrow gate 51. It will be observed that the output of the second stage 12 is not controlled by the narrow gate 51, and additional stages having an input connection in parallel with the conductor 49 may be provided for obtaining receiver output throughout the duration of the wide time gate voltage 16 with output level maintained constant with respect to whichever target is selected by the position of the narrow gate 51 in relation to the transmitted pulses.

The filter circuit 81 prevents the automatic gain control circuit from eliminating the spinner modulations from the receiver output because it is set at a sharp cut-off frequency lower than the spinner modulation frequency. Owing to the sharp cut-off of the filter, the automatic gain-control is fast acting and lower frequency modulations and random modulations are eliminated from the receiver output. However, the desired signal is not interfered with.

The importance of eliminating lower frequency modulations will become more apparent from a consideration of the manner of operation of servo apparatus which may be connected to the output terminal 15 of the receiver. Such servo apparatus ordinarily includes a servo amplifier. Assuming a pulse system where the spin frequency is twenty cycles per second, the servo amplifier ordinarily has a pass band extending approximately from 17 to 23 cycles (i. e., it is six cycles wide). Signal frequency modulations in this region cannot be wiped out by the automatic gain control without an adverse effect on the follow-up system of the servo. However, without the employment of my invention, it would be possible for modulation frequencies up to three cycles per second to appear in the servo pass band. This would occur because these low frequencies would appear as a double modulation of the carrier, which means that the 20-cycle modulation would be modulated by a low frequency, for instance, two cycles per second. Thus, sidebands of 18 and 22 cycles per second would be created. When demodulated in the servo amplifier, these 18- and 22-cycle sidebands could cause errors and overloading. However, if the automatic gain control is made to operate effectively at two cycles per second, in accordance with my invention, the undesired double modulation is avoided or erased, so that no sideband components appear in the servo pass band.

A modification in the automatic gain control arrangement is illustrated in the fragmentary circuit diagram of Fig. 4. The apparatus represented in this circuit is also so arranged that the potential of the screen grids of the intermediate amplifiers 11 and 12 may be varied from zero to any desired positive value. In this case, a cathode follower stage 121 corresponding to stage 22 of Fig. 1 is also employed, having a cathode resistor 108. The latter is connected to a conductor 110 connected to the gain control connection 18 of the amplifier stages 11 and 12, shown in Fig. 1.

An automatic volume control detector 60a of the diode type, such as discussed in connection with Fig. 1, may also be employed, having an input connection 58 taken directly or through a potentiometer (not shown) from the output of the receiver. A filter circuit 81 comprising the condenser 82 and the inductance 83 may also be employed as previously described. However, in the arrangement of Fig. 4 the diode detector 60a need not be operated from a negative potential.

For making the cathode follower stage 121 responsive to a negative wide gate 16' connected to a wide gate input terminal 17' instead of responsive to a positive wide gate, an inversion stage 122 is interposed between the filter 81 and the cathode follower or impedance transformer stage 121.

The inversion stage 122 comprises an electric discharge device such as a tetrode vacuum tube having an anode 123, a cathode 124, which may be indirectly heated if desired, a control electrode or grid 125 and a second control electrode or screen grid 126. A load resistor 127 is connected in series with the anode 123 and the positive connection 30 of the voltage supply 29. The cathode 124 may be connected directly to the ground connection 38. For maintaining the screen grid 126 at a suitable potential, a dropping resistor 128 may be connected between the positive connection 30 of the voltage supply 29 and the screen grid 126. A by-pass condenser 129 may also be provided. For coupling the grid 106 of the cathode follower 121 to the inverter anode 123, a condenser 130 may be provided. For negatively biasing the cathode follower 121, a source of negative voltage such as a C battery 131 may be connected between the grid 106 and the ground connection 38.

A resistor 132 may be connected between the control electrode 125 and the positive terminal 133 of the filter condenser 38 for isolating the gate 16' from the filter 81.

According to the amplitude of the receiver output, an automatic volume control voltage of negative polarity appears across the load resistor 63' and the condenser 82. This voltage determines the average potential of the control electrode 125 of the tube 122. The stronger the receiver output and the greater the output of the detector 60a, the lower the potential of the grid 125; and accordingly, the less the voltage drop in the load resistor 127, the higher the average potential of the anode 123, the less the swing in anode voltage and the less the amplification of the inverter 122.

During negative swings of the wide gate voltage 16' the control grid 125 is depressed below the average potential to which it is biased through the resistor 132 by the automatic volume control voltage appearing across the condenser 82. Accordingly, potentials of the anode 123, the grid 106, and the cathode 105 rise and the receiver becomes responsive during the negative swings of the wide gate voltage 16'. However, the degree of amplification of the gate 16' depends upon the average potential of the grid 126, which is determined by the automatic volume control voltage. If the latter voltage is so large as to cut off the tube 122, its anode 123 remains at maximum potential reducing the anode potential swing to zero and causing zero gate to be delivered to the cathode follower 121.

In case excessively wide variations in strength of the input to the receiver are to be expected, a modified arrangement, such as represented by the block diagram of Fig. 5 may be employed. In this case the apparatus may be similar to that illustrated in Fig. 1 with the addition of a comparison circuit 134 for comparing the receiver output with the automatic volume control voltage and transferring only an error voltage through a controller 135 to the controlled amplifier stages 136. The controlled amplifier stages 136 represented in Fig. 5 may comprise the vacuum tube stages 11 and 12 of Fig. 1. The remaining stages 13 of the receiver may be coupled to the controlled amplifier stages 136 through a connection 49, as explained in connection with Fig. 1.

The controller 135 may comprise the stages 19, 20, 21 and 22 of Fig. 1. The comparison circuit 135 is shown in greater detail in Fig. 6.

The comparison circuit of Fig. 6 comprises an electric discharge device such as a triode vacuum tube 137, for example, connected as a cathode follower stage having an anode 138, a cathode 139, and a control electrode or grid 141. The anode 138 is connected to the positive connection 39 of a voltage supply source, and the cathode 139 is connected in series with a cathode resistor 142 to the grounded connection 38. For applying an adjustable negative bias to the control electrode or grid 141, a pair of negative voltage sources 143 and 144 connected in series may be provided. The voltage sources 143 and 144 may take the form of C batteries, with the positive terminal of the battery 143 connected to the ground connection 38 and with a potentiometer 145 connected across the battery 144. The potentiometer 145 is provided with an adjustable tap 146 connected in series with a grid leak resistor 147 to the control grid 141.

The control grid 141 is coupled through a coupling condenser 148 and a conductor 149 to the output terminal 15 of the receiver. The cathode 139 serving as the output terminal of the comparison circuit 134 is connected to the input of the diode detector unit 19 of Fig. 1. Thus, the conductor 58 of Fig. 1 is connected to the cathode 139 of Fig. 6. The coupling condenser 65 and the conductor 152 interposed between the condenser 65 and the diode unit 60a of Fig. 1 serve to impress the output of the comparison circuit 134 on the unit 60a.

The potentiometer 145 has its tap 146 set to produce an output voltage across the cathode resistor 142 corresponding to a desired output level for the receiver stages 13 of Figs. 1 and 4. The voltage of the battery 143 represents the cut-off bias in tube 137. The voltage between the potentiometer tap 146 and the junction terminal 153 of the batteries 143 and 144 represents the desired output level which should appear between the output terminal 15 and the ground connection 38. If this output level should be exceeded, the potential of the control grid 141 of the tube 137 rises above the cut-off value, and a voltage which may be called an error voltage appears at the conductor 58. This error voltage is the difference between the actual receiver output and the desired receiver output. Thus, in Fig. 6 the actual receiver output is assumed to be fluctuating, as represented by a curve 154 drawn with respect to a zero line 155, and error voltage is represented by the curve 156, also drawn with respect to corresponding zero line 155, with a dotted line 157 representing the desired output level. Only the excess voltage fluctuations above the output level 157 are passed to the controller 135, and accordingly the excess or error voltage is demodulated and amplified in the controller 135 to produce a gain control voltage of inverse phase fluctuating in accordance with any deviation of the receiver output voltage 154 from a desired level 157 to maintain the receiver output substantially constant.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pulse receiver intended to be responsive during time intervals represented by time gates consisting of square wave voltage fluctuations, said receiver comprising an amplifier with a voltage-responsive gain-determining connection, subsequent receiver stages cascaded with said amplifier, output terminals for said subsequent stages, an automatic volume control detector coupled to said output terminals, a direct current amplifier with a negative connection to below ground potential and an output connection for producing potentials above or below ground, a low-pass sharp cut-off filter interposed between said automatic volume control detector and said direct current amplifier, an automatic volume control level-setter diode connected to said direct current amplifier output connection, a cathode follower with an output to said voltage-responsive gain-determining amplifier connection, and means for coupling a time-gate voltage to said level-setter diode, said cathode follower having a ground connection and having an ungrounded input connection to said level-setter diode, whereby the level-setter diode and the cathode follower input connection may be maintained at an average potential above or below ground according to the automatic volume control detector output, and the gate voltage output of the cathode follower applied to the amplifier voltage-responsive gain-determining connection is varied between wide limits from zero to a maximum value for adjusting the pulse receiver to uniform output with widely varying input signal strength.

2. A receiver, comprising a stage with a voltage-responsive gain-determining connection, output terminals coupled to said stage, an automatic volume control detector coupled to said output terminals, an amplifier with a negative connection to below ground potential and an output connection for producing potentials above or below ground, a low-pass sharp cut-off filter interposed between said automatic volume control detector and said direct current amplifier, a cathode follower with an output to said voltage-responsive gain-determining amplifier connection, with a ground connection and also with an ungrounded input connection coupled to said amplifier whereby the cathode follower input connection may be maintained at a potential above or below ground according to the automatic volume control detector output, and the voltage output of the cathode follower applied to the amplifier voltage-responsive gain-determining connection is varied between wide limits from zero to a maximum value for adjusting the pulse receiver to uniform output with widely varying input strength.

3. A receiver, comprising a stage with a voltage-responsive gain-determining connection, output terminals coupled to said stage, an automatic volume control detector coupled to said output terminals, an amplifier with a negative connection to below ground potential and an output connection for producing potentials above or below ground, a cathode follower with an output to said voltage-responsive, gain-determining connection with a ground connection and also with an ungrounded input connection coupled to said amplifier whereby the cathode follower input connection may be maintained at a potential above or below ground according to the automatic volume control detector output, and the voltage output of the cathode follower applied to the amplifier voltage-responsive gain-determining connection is varied between wide limits from zero to a maximum value for adjusting the receiver to uniform output with widely varying input signal strength.

4. A receiver for recovering low frequency modulations, comprising a voltage-responsive, gain-determining connection, output terminals, an automatic volume control detector coupled to said output terminals, a source of variable unidirectional voltage with a voltage control responsive to the output of said automatic volume control detector, coupling between said voltage source and the voltage-responsive gain-determining connection of the receiver, and a low-pass sharp cut-off filter interposed between said automatic volume control detector and said variable voltage source control, whereby the receiver output is maintained substantially constant with respect to undesired variations having a frequency of fluctuation smaller than the desired low frequency modulations.

5. An automatic gain control circuit for a pulse receiver, having an input terminal, an output terminal at which the level is to be maintained substantially constant, and a gain control terminal, said gain control circuit comprising an impedance transformer with an output connection to a receiver gain control terminal, an automatic volume control detector with an input connection to the receiver output terminal, and an inversion circuit, said inversion circuit having an input terminal connected to the output of the automatic volume control detector and having a connection to a receiver wide gate input terminal, said inversion circuit having an output coupling to said impedance transformer for controlling the impedance of the impedance transformer.

6. An automatic gain control circuit for a receiver having an output terminal and a gain control terminal, said automatic gain control circuit comprising an automatic volume control detector with an output terminal and with an input terminal connected to a receiver output terminal, an inversion stage comprising an electric discharge device with an anode, a load resistor in series therewith, and a control electrode, and an impedance transformer having an impedance controlling electrode and having an output terminal connected to a receiver gain control terminal, the control electrode of said inversion circuit being connected to the output of said automatic volume control detector, and said load resistor being coupled to the control electrode of the impedance transformer.

7. A receiver comprising a controlled amplifier stage with a gain control connection therein, subsequent receiver stages and an output terminal, a comparison circuit, and a controller interposed between the output terminal and said gain control connection, said comparison circuit comprising means for producing a fixed voltage serving as a standard level to be maintained, and means producing an error voltage representing the difference between said fixed voltage and the voltage at the receiver output terminal, said controller having an input terminal to which said error voltage is applied and comprising means for inverting the phase of said error voltage and applying a gain control voltage dependent thereon to the gain control connection of said amplifier.

8. A comparison circuit for a volume controlled receiver, comprising an electric discharge device with an anode, a cathode, and a control electrode, an input terminal for connection to the output of a receiver, said input terminal being coupled to the control electrode, an output terminal for connection to the gain control of a receiver, said output terminal being coupled to the cathode, a cathode resistor for connection in series with said discharge device to a source of anode voltage, a source of negative bias voltage of sufficient magnitude to lower the potential of the control electrode to cut-off value, said source having a positive terminal connected to said cathode resistor, an adjustable source of bias voltage having a positive terminal connected to the negative terminal of said first-mentioned bias voltage source and having a negative terminal connected to said control electrode for adjustably biasing the same according to the receiver output level to be maintained.

9. In an automatic follow system for tracking a target tending to change in attitude and moving in a medium subject to changing propagation effects whereby undesired low frequency variations in reflection from the target may occur, the combination of a receiver and a follow element coupled to the receiver and movable in response to variations in strength of higher frequency modulations recovered by the receiver as variations take place in the relative positions of a target and follow element, said receiver comprising a voltage-responsive gain-determining connection, output terminals, an automatic volume control detector coupled to said output terminals, a source of variable unidirectional voltage with a voltage control responsive to the output of said automatic volume control detector, coupling between said voltage and the voltage-responsive gain-determining connection of the receiver, and a low pass sharp cut-off filter interposed between said automatic volume control detector and said variable voltage source control, whereby the receiver output is maintained substantially constant with respect to undesired variations, having a frequency of fluctuation smaller than the desired modulations.

10. In an automatic follow system for tracking a target tending to change in attitude and moving in a medium subject to changing propagation effects whereby undesired low frequency variations in reflection from the target may occur, the combination of a receiver and a follow element coupled to the receiver and movable in response to variations in the strength of higher frequency modulations recovered by the receiver as variations take place in the relative positions of the target and the follow element, said receiver comprising an automatic volume control having means for eliminating volume control response to variations in volume at a frequency higher than a predetermined frequency below the frequency of the desired modulations.

11. In an automatic follow system for tracking a target tending to change in attitude and moving in a medium subject to changing propagation effects whereby undesired low frequency variations in deflection from the target may occur, the combination comprising means for reflecting radiant energy from a target and modulating the energy at a low frequency, higher than the frequency of undesired low frequency variations, a receiver and a follow element coupled to the receiver, movable in response to variations in the strength of modulations recovered by the receiver as variations take place in relative position of the target and the follow element, said receiver comprising an automatic volume control having means for eliminating volume control response to variations in volume at a frequency higher than a predetermined frequency below the modulation frequency.

DANIEL S. PENSYL.

REFERENCES CITED

The following references are of record in the file of this patent:

UNITED STATES PATENTS

| Number | Name | Date |
|---|---|---|
| 2,063,534 | Wallace | Dec. 8, 1936 |
| 2,225,524 | Percival | Dec. 17, 1940 |
| 2,226,860 | Grieg | Dec. 31, 1940 |
| 2,289,493 | George | July 14, 1942 |
| 1,931,660 | Kautter | Oct. 24, 1933 |
| 2,054,825 | Koch | Sept. 22, 1936 |
| 2,128,996 | Foster | Sept. 6, 1938 |